UNITED STATES PATENT OFFICE.

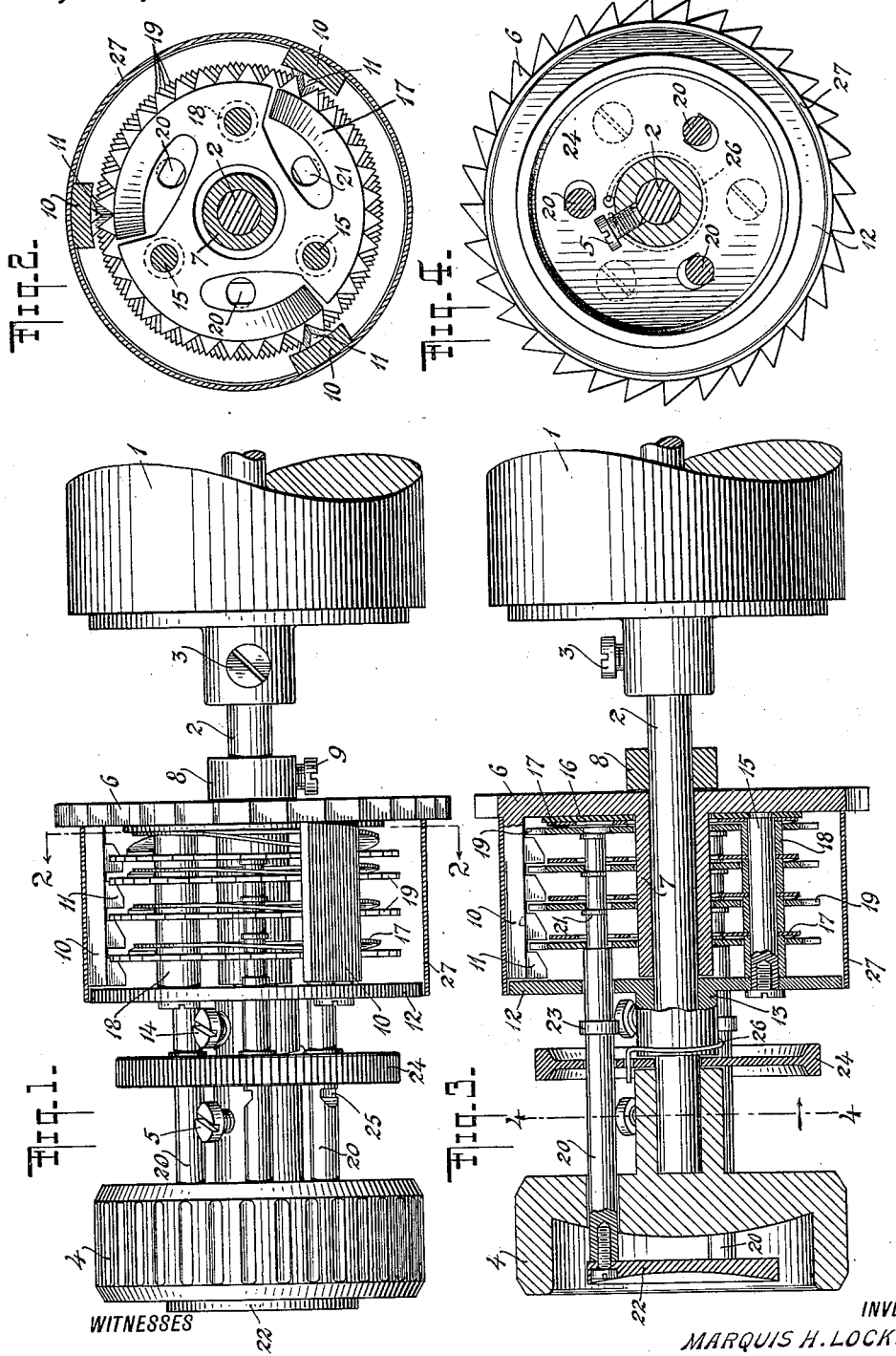

MARQUIS H. LOCKWOOD, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,085,746.  Specification of Letters Patent.  Patented Feb. 3, 1914.

Application filed December 30, 1912. Serial No. 739,226.

*To all whom it may concern:*

Be it known that I, MARQUIS H. LOCKWOOD, a citizen of the United States, and a resident of the borough of Manhattan, city, county, and State of New York, have invented certain new and useful Improvements in Type-Writing Machines, of which the following is a specification.

My invention relates more particularly to platen releases which are adapted to releasably secure the platen and line-space wheel together to revolve in unison. Some friction devices for this purpose are apt to slip under particularly severe use and toothed devices are usually limited to positions depending upon the fineness of the teeth employed.

The object of my invention is to overcome these objections and so combine friction and toothed devices in such manner that the platen and line space wheel may be connected together at any desired relative position.

The device here shown is an improvement upon the device shown and described in my application, Serial No. 713,782, filed August 7, 1912, and consists primarily of a plurality of wedge teeth extending radially inward from flange arms carried by the line space wheel and a plurality of parallel star-toothed disks spring pressed and slidably mounted for frictional wedging engagement with the corresponding wedge teeth whereby the platen and line-space wheel are held to revolve in unison. Suitable means is also provided for manually releasing the star-toothed disks from engagement with the wedge teeth so that the platen may be revolved independently of the line-space wheel.

The accompanying drawings show one form of my improved device, Figure 1 being an enlarged plan view of the device with the cover ring removed. Fig. 2 is a cross section at 2—2 of Fig. 1 looking toward the left. Fig. 3 is a partial longitudinal section, and Fig. 4 is looking toward the right in cross section at 4—4 of Fig. 3.

Referring to the drawings, 1 represents the platen secured to the axle 2 by the usual set screw 3. The end of the axle is provided with the usual finger wheel 4 secured thereto by the set screw 5 as indicated. Between the platen and the finger wheel is mounted the line-space wheel 6 which, in the present instance, is provided with an elongated hub 7 and adapted to rotate on the axle 2. The line-space wheel 6 is retained in proper relation to the other parts by the collar 8 which is secured to the axle 2 by a set screw 9; the line-space wheel is provided with one or more laterally extending arms 10 located near the periphery thereof. The arms 10 may be separably attached to the line-space wheel in a suitable manner for convenience in assembling. Arms 10 are arranged parallel with the axle 2 and in the present instance, are each provided with four wedge-like teeth 11 located in the same line, parallel with the axle but spaced apart a short distance for the purpose hereinafter described. The wedge teeth 11 are double beveled or wedge-shaped as indicated in Fig. 2 of the drawings, the pointed end of the wedge being toward the line-space wheel. Beyond the ends of the arm 10 is located a circular disk 12 provided with a hub 13 by which it is secured to the axle 2 in any suitable manner as by set screw 14. The circular disk 12 is in the present instance provided with three laterally-extending rods or parts 15 which are spaced apart 120° and each is secured by riveting or otherwise to a thin end plate or separating disk 16. The rods 15 are adapted to support a plurality of toothed disks and actuating springs therefor; four each, in the present instance being used. The first spring 17 is slipped onto the rods and lies next to the separating disk 16. A collar 18 is then slipped onto each of the rods 15 and then a toothed disk 19 is slipped over the collars. Another spring member 17 is slipped onto the rods and then another set of collars and another disk 19, and so until the four springs, four sets of collars and four toothed disks are in place.

The springs are of thin material and are provided as shown in Fig. 2 with three leaves which are adapted to rest against and actuate a star-toothed disk 19, four of which are employed in the device here shown. It will be understood that the toothed disks 19 are provided with holes corresponding in size with the outer diameter of the collars 18 and are adapted to be slipped over these collars and alternate with the springs 17 as indicated in the drawings. The star-toothed disks 19 are preferably made of thin steel and each provided with the same number of teeth which, in the device shown, should be some multiple of three, the teeth thereof being adapted to coöperate with the wedge teeth 11 for securing the platen and line-space wheel together to revolve in unison. The toothed disks 19 are located on the posts 15 or rather on the collars 18 in different angular positions. Each succeeding toothed disk 19 is advanced circumferentially a quarter of a tooth space distance so that the four disks, when viewed transversely, will have the appearance indicated in Fig. 2 of the drawings. By this arrangement it will be seen that no matter what relative position the platen may assume with respect to the line-space wheel two or more of the toothed disks 19 will engage the corresponding wedge teeth 11, as indicated in Fig. 1 of the drawings. The amount of wedging or the distance any toothed disk is forced along the corresponding wedge teeth will depend upon the position of the parts. If stopped at the quarter tooth position one of the disks 19 will be moved the full extent of its wedge teeth 11. At positions in between the quarter position the wedging will vary but in any position the friction between the toothed disks and the wedge teeth will be sufficient to prevent displacement. This wedging of the teeth of the disks 19 with the wedge teeth 11 will tend to firmly hold the platen and line-space wheel together so as to revolve in unison. This arrangement of the laterally movable toothed disks 19 enables a quick and easy release of the disks when it is desired to rotate the platen independently of the line-space wheel. For the purpose of simultaneously moving all of the toothed disks 19 out of engagement with their corresponding wedge teeth, I have provided the three rods 20 which pass through the circular disk or plate 12 and through the several toothed disks 19 as indicated in Fig. 3 of the drawings. The inner end of the rod 20 is provided with a series of integral partial rings or collars 21 which are formed by turning down the shaft, these collars being provided for the purpose of picking up and moving the disks 19 in the manner indicated above. In order that the rods 20 may readily be inserted or passed through the disks 19 in assembling, the holes in the disks are flattened at one point by a segment of the metal of the disk remaining within the circumference of the circle of the holes which equals the larger diameter of the rods 20 and the rings or collars 21 are flattened or milled down to the smaller diameter of the rod 20 so that in one position they may readily be passed through the holes in the disks 19; after which the rods are turned so that the flattened portions of the holes and collars are out of alinement, as indicated in Figs. 2 and 3 of the drawings. In this position the outer ends of the rod 20 are connected by a plate 22 which is adapted to serve as a finger key for operating the rods to release the disks 19. When the finger of the operator is removed from the key cap 22 after the rods have been pressed in to release the platen from the line-space wheel the springs 17 will restore the rods as well as the individual disks 19 or at least thrust the latter toward the left as seen in Figs. 1 and 3, and into engagement with the corresponding wedge teeth 11. When thus released, the rods 20 will be moved toward the left, and to prevent movement thereof too far a suitable stop may be employed, as for instance, the collars 23 which are adapted to contact with the locking disk 24. Frequently it is desired to retain the platen and line-space wheel disengaged without continued pressure of the finger on the key cap 22. For this purpose each of the rods 20 is provided with a notch 25 into which the locking disk 24 is adapted to be thrust when the rods 20 are pushed in to release the disks 19. This position of the released disks and parts is indicated in Fig. 3 of the drawing and the locking position of the locking disk 24 is shown in Fig. 4 of the drawings. A spring 26 is provided to actuate the disk 24 in one direction. In the device, as shown, the spring is adapted to thrust the disk 24 into the notches when the rods are pushed in to release the disks and permit the rotation of the platen independently of the line-space wheel thereby holding the parts in the released position until the disk is turned by its knurled edge in the opposite direction.

A sheet metal cylindrical ring 27 is here shown as slipped over the arms 10 for the purpose of forming an inclosure for the device.

Various modifications may be made within the scope of the claims without departing from the spirit of my invention.

I claim:

1. In a platen release for typewriters the combination of a platen, a line space wheel, a plurality of wedge teeth connected with said line space wheel, and a plurality of laterally movable toothed disks connected with said platen and adapted to coöperate with said wedge teeth to secure the platen and line space wheel together to revolve in unison.

2. In a platen release for typewriters the combination of a platen, a line space wheel, a plurality of wedge teeth connected with said line space wheel, a plurality of laterally movable toothed disks connected with said platen and adapted to coöperate with said wedge teeth to secure the platen and line space wheel together, a plurality of springs, one for each toothed disk, for holding said disks in engagement with the corresponding wedge teeth, and means for disengaging the disks and wedge teeth at will.

3. In a platen release for typewriters the combination of a platen, a line space wheel, a plurality of wedge teeth connected with said line space wheel, a plurality of laterally movable toothed disks connected with said platen and adapted to coöperate with said wedge teeth to secure the platen and line space wheel together, a plurality of springs, one for each toothed disk, for holding said disks in engagement with the corresponding wedge teeth, means for disengaging the disks and wedge teeth at will, and means coöperating with said last named means for locking the disks in disengaged position.

4. In a platen release for typewriters, the combination of a platen provided with an axle, a line space wheel mounted on said axle, lateral projections near the periphery of said line space wheel, a plurality of wedge teeth extending radially inward from each of said projections and spaced apart in a line parallel with said axle and a plurality of toothed disks concentric with said axle and adapted to coöperate with said wedge teeth to secure the platen and line space wheel together to revolve in unison.

5. In a platen release for typewriters the combination of a platen provided with an axle, a line space wheel mounted on said axle, lateral projections near the periphery of said line space wheel, a plurality of wedge teeth extending radially inward from each of said projections and spaced apart in a line parallel with said axle, a plurality of toothed disks concentric with said axle and separately movable longitudinally thereof, means connecting said disks to rotate with the platen and resilient members alternating with said disks and adapted to hold the disks in engagement with the respective wedge teeth thereby securing the platen and line space wheel together to revolve in unison.

6. In a platen release for typewriters the combination of a platen provided with an axle, a line space wheel mounted on said axle, lateral projections near the periphery of said line space wheel, a plurality of wedge teeth extending radially inward from each of said projections and spaced apart in a line parallel with said axle, a plurality of toothed disks concentric with said axle, and separately movable longitudinally thereof, means connecting said disks to rotate with the platen, resilient members alternating with said disks and adapted to hold the disks in engagement with the respective wedge teeth thereby securing the platen and line space wheel together to revolve in unison and means for simultaneously moving all of said disks out of engagement with the respective wedge teeth.

7. In a platen release for typewriters the combination of a platen provided with an axle, a line space wheel mounted thereon, means for connecting the platen and line space wheel to revolve in unison, rods, slidable longitudinally of said platen axle for disconnecting said platen and line space wheel thereby permitting the platen to be revolved independently of said line space wheel, notches in said rods, a revoluble disk latch mounted on said axle and having portions adapted to enter said notches when said rods have been pushed in to release the platen, and a spring for rotating said disk latch in one direction.

8. In a platen release for typewriters the combination of a platen provided with an axle, a line space wheel, a plurality of radially extending wedge teeth carried upon said line space wheel, a circular plate secured to said axle so as to revolve with the platen, rods projecting from said plate toward the line space wheel, star toothed disks mounted upon and adapted to slide longitudinally of said rods, leaf springs alternating with said toothed disks and equably spaced apart along and secured to said rods, said springs being adapted to move and hold the respective toothed disks in engagement with the corresponding wedge teeth, thereby connecting the platen and line space wheel together to revolve in unison, and means for simultaneously disengaging the toothed disks from the wedge teeth to permit the platen to be revolved independently of said line space wheel.

In testimony whereof I have hereunto set my hand in the presence of two subscribing witnesses.

MARQUIS H. LOCKWOOD.

Witnesses:
  JOHN A. KEHLENBECK,
  G. V. RASMUSSEN.

---

Copies of this patent may be obtained for five cents each, by addressing the "Commissioner of Patents, Washington, D. C."